US012272785B2

(12) United States Patent
Yashiro et al.

(10) Patent No.: US 12,272,785 B2
(45) Date of Patent: Apr. 8, 2025

(54) ALL-SOLID SECONDARY BATTERY (71) Applicant: Samsung Electronics Co., Ltd., Suwon-si (KR)

(72) Inventors: Nobuyoshi Yashiro, Yokohama (JP); Shoichi Sugata, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 138 days.

(21) Appl. No.: 17/545,091

(22) Filed: Dec. 8, 2021

(65) Prior Publication Data

US 2022/0311047 A1    Sep. 29, 2022

(30) Foreign Application Priority Data

Mar. 24, 2021  (JP) ................................. 2021-050120
May 31, 2021   (KR) ........................ 10-2021-0070153

(51) Int. Cl.
*H01M 10/0562*   (2010.01)
*H01M 4/131*     (2010.01)
(Continued)

(52) U.S. Cl.
CPC ....... *H01M 10/0562* (2013.01); *H01M 4/131* (2013.01); *H01M 4/133* (2013.01);
(Continued)

(58) Field of Classification Search
CPC ......... H01M 10/0562; H01M 10/0525; H01M 4/133; H01M 4/587; H01M 4/134;
(Continued)

(56) References Cited

U.S. PATENT DOCUMENTS 8,257,858 B2    9/2012  Kashiwagi
10,199,691 B2   2/2019  Kim et al.
(Continued)

FOREIGN PATENT DOCUMENTS

JP    H0578910 A      10/1993
JP    2003346907 A    12/2003
(Continued)

OTHER PUBLICATIONS

European Search Report for European Patent Application No. 22151088.6 dated Jun. 27, 2022.
(Continued)

*Primary Examiner* — Laura Weiner
(74) *Attorney, Agent, or Firm* — CANTOR COLBURN LLP (57) ABSTRACT

An all-solid secondary battery includes a cathode layer, an anode layer having an anode current collector and an anode active material layer on the anode current collector, and a solid electrolyte layer between the cathode layer and the anode layer, wherein the solid electrolyte is an oxide, phosphate, borate, sulfate, an oxynitride, or a combination thereof, and a binding strength between the anode and the solid electrolyte layer is in a range of about 14 millinewtons per millimeter to about 100 millinewtons per millimeter, and a film strength of the anode active material layer is in a range of about 16 megapascals to about 85 megapascals.

15 Claims, 4 Drawing Sheets

(51) Int. Cl.
*H01M 4/133* (2010.01)
*H01M 4/134* (2010.01)
*H01M 4/36* (2006.01)
*H01M 4/38* (2006.01)
*H01M 4/525* (2010.01)
*H01M 4/587* (2010.01)
*H01M 4/62* (2006.01)
*H01M 10/0525* (2010.01)
*H01M 10/0585* (2010.01)
*H01M 50/431* (2021.01)
*H01M 50/46* (2021.01)
*H01M 4/02* (2006.01)
*H01M 10/42* (2006.01)

(52) U.S. Cl.
CPC .......... *H01M 4/134* (2013.01); *H01M 4/364* (2013.01); *H01M 4/366* (2013.01); *H01M 4/38* (2013.01); *H01M 4/382* (2013.01); *H01M 4/386* (2013.01); *H01M 4/525* (2013.01); *H01M 4/587* (2013.01); *H01M 4/621* (2013.01); *H01M 10/0525* (2013.01); *H01M 10/0585* (2013.01); *H01M 50/431* (2021.01); *H01M 50/46* (2021.01); *H01M 2004/021* (2013.01); *H01M 2004/027* (2013.01); *H01M 2004/028* (2013.01); *H01M 2010/4292* (2013.01); *H01M 2300/0068* (2013.01); *H01M 2300/0071* (2013.01)

(58) Field of Classification Search
CPC ...... H01M 4/364; H01M 4/621; H01M 4/525; H01M 4/505; H01M 4/131; H01M 50/431; H01M 50/46; H01M 2300/0071; H01M 2300/0068
See application file for complete search history.

(56) References Cited

U.S. PATENT DOCUMENTS

| | | |
|---|---|---|
| 11,069,895 B2 | 7/2021 | Cho et al. |
| 2004/0023116 A1 | 2/2004 | Fujino et al. |
| 2017/0179519 A1 | 6/2017 | Okamoto et al. |
| 2018/0351159 A1 | 12/2018 | Fujiki et al. |
| 2020/0052327 A1 | 2/2020 | Osada |
| 2020/0136178 A1 | 4/2020 | Ku et al. |
| 2021/0210791 A1 | 7/2021 | Suzuki et al. |

FOREIGN PATENT DOCUMENTS

| | | | |
|---|---|---|---|
| JP | 3822550 B2 | * | 6/2006 |
| JP | 2008117574 A | | 5/2008 |
| JP | 2012-243476 | * | 12/2012 |
| JP | 2012243476 A | | 12/2012 |
| JP | 2016192370 A | | 11/2016 |
| JP | 201996610 A | | 6/2019 |
| JP | 6639383 B2 | | 1/2020 |
| KR | 1020170100356 A | | 9/2017 |
| KR | 1020180106978 A | | 10/2018 |
| KR | 1020200050005 A | | 5/2020 |
| WO | WO 2014/080895 | * | 5/2014 |
| WO | 2015146315 A1 | | 10/2015 |
| WO | 2020067108 A1 | | 4/2020 |

OTHER PUBLICATIONS

Sa (Arithmetical Mean Height) | Area Roughness Parameter; https://www.keyence.com/ss/products/microscope/roughness/surface/parameters.jsp; 3 pages; received Oct. 2024.
Wikipedia, Surface roughness; https://en.wikipedia.org/wiki/Surface_roughness; 14 pages; received Oct. 2024.

* cited by examiner

ALL-SOLID SECONDARY BATTERY

CROSS-REFERENCE TO RELATED APPLICATIONS

This application claims priority to Japanese Patent Application No. 2021-050120, filed on Mar. 24, 2021, in the Japan Patent Office, and Korean Patent Application No. 10-2021-0070153, filed on May 31, 2021, in the Korean Intellectual Property Office, and all the benefits accruing therefrom under 35 U.S.C. § 119, the contents of which are incorporated herein by reference in their entireties.

BACKGROUND

1. Field

The disclosure relates to an all-solid secondary battery.

2. Description of the Related Art

An all-solid secondary battery using lithium as an anode active material is a battery in which lithium is precipitated in an anode layer by charging, as an active material.

In such an all-solid secondary battery, when the precipitated lithium in the anode layer grows in a branched shape through the gap of a solid electrolyte layer, the lithium may cause a short-circuit, or may cause a decrease in battery capacity.

An all-solid secondary battery disclosed in JP-A-2019-096610 is considered as an all-solid secondary battery capable of suppressing generation or growth of lithium dendrites in the solid electrolyte layer. In the all-solid secondary battery disclosed in JP-A-2019-096610, lithium may precipitate in an anode active material layer or on a back surface (a current collector side) of the anode active material layer after lithium is absorbed in the anode active material layer in an initial state of charging beyond a capacity of the anode active material layer by using an alloy-forming element that forms an alloy or a compound with lithium as an anode active material. As a result, generation or growth of lithium dendrites on the solid electrolyte may be suppressed, and the occurrence of a short-circuit and a decrease in battery capacity may be suppressed. Nonetheless, there remains a need for improved battery materials.

SUMMARY

When the anode layer of JP-A-2019-096610 is used in combination with a solid electrolyte layer only including an oxide-based solid electrolyte as a solid electrolyte, a short-circuit suppressing effect of an expected degree may not be obtained, and thus it would be desirable that lithium dendrites be further suppressed when the anode layer is used in combination with a solid electrolyte layer only including an oxide-based solid electrolyte as a solid electrolyte.

Disclosed is an all-solid secondary battery capable of sufficiently suppressing generation or growth of lithium dendrites to suppress a short-circuit or a decrease in battery capacity even when the all-solid secondary battery includes a solid electrolyte layer including an oxide-based solid electrolyte film as a solid electrolyte.

Additional aspects will be set forth in part in the description which follows and, in part, will be apparent from the description, or may be learned by practice of the presented embodiments of the disclosure.

According to an aspect of an embodiment, an all-solid secondary battery includes a cathode layer; an anode layer comprising an anode current collector and an anode active material layer on the anode current collector; and a solid electrolyte layer between the cathode layer and the anode layer, wherein the solid electrolyte layer includes a solid electrolyte and the solid electrolyte is an oxide, phosphate, borate, sulfate, an oxynitride, or a combination thereof (i.e., the solid electrolyte layer only includes an oxide, phosphate, borate, sulfate, an oxynitride, or a combination thereof as a solid electrolyte), and a binding strength between the anode layer and the solid electrolyte layer is in a range of about 14 millinewtons per millimeter (mN/mm) to about 100 mN/mm, and a film strength of the anode active material layer is in a range of about 16 megapascals to about 85 megapascals. The anode current collector may be in a plate form or a foil form.

Since the binding strength between the anode layer and the solid electrolyte layer is in a range of about 14 mN/mm to about 100 mN/mm, when the all-solid secondary battery uses a solid electrolyte layer formed of a solid electrolyte which is an oxide, phosphate, borate, sulfate, an oxynitride, or a combination thereof instead of a solid electrolyte layer including a sulfide-based solid electrolyte, lithium precipitation between the anode layer and the solid electrolyte layer may be suppressed, and generation or growth of lithium dendrites may be sufficiently suppressed. A short-circuit and a decrease in capacity of the all-solid secondary battery caused by generation or growth of lithium dendrites may be suppressed.

When the anode layer includes an anode current collector; and an anode active material layer stacked on the anode current collector and has a film strength of the anode active material layer in a range of about 16 megapascals (MPa) to about 85 MPa, lithium may be precipitated in the anode active material layer, and thus generation of cracks in the anode active material layer may be suppressed.

According to an aspect of an embodiment, the anode active material layer may include an anode active material that forms an alloy or a compound with lithium; a carbonaceous anode active material; or a combination thereof.

According to an aspect of an embodiment, the anode active material that forms an alloy or a compound with lithium may include an alloy-forming element comprising gold (Au), platinum (Pt), palladium (Pd), silicon (Si), silver (Ag), aluminum (Al), bismuth (Bi), tin (Sn), zinc (Zn), or a combination thereof. The anode active material that forms an alloy or a compound with lithium can be in the form of particles, and the particles may have a particle diameter in a range of about 20 nanometers (nm) to about 4 microns (μm). The all-solid secondary battery may further include a conductive coating layer arranged on a surface of the particles, wherein a thickness of the conductive coating layer may be in a range of about 1 nm to about 10 nm.

According to an aspect of an embodiment, the anode active material layer may include an anode active material that forms an alloy or a compound with lithium; and a carbonaceous anode active material. The anode active material that forms an alloy or a compound with lithium may include an alloy-forming element, and the carbonaceous anode active material may include amorphous carbon. An amount of the alloy-forming element may be in a range of about 5 parts to about 25 parts by weight, and an amount of the amorphous carbon may be in a range of about 50 parts to about 90 parts by weight, each based on 100 parts by weight of the anode active material layer.

According to an aspect of an embodiment, the anode active material layer may further include a binder, and an amount of the binder may be in a range of about 0.5 parts to about 30 parts by weight based on 100 parts by weight of the anode active material layer.

According to an aspect of an embodiment, the cathode layer may include a cathode active material layer, and the anode layer may include an anode active material layer, wherein a ratio of a charge capacity of the cathode active material layer to a charge capacity of the anode active material layer may satisfy Expression (1):

$$0.01 < b/a < 0.5 \qquad (1)$$

wherein in Expression 1, a is a charge capacity of the cathode active material layer and b is a charge capacity of the anode active material layer.

According to an aspect of an embodiment, a thickness of the anode active material layer may be in a range of about 1 μm to about 20 μm.

According to an aspect of an embodiment, a surface roughness of a surface of the solid electrolyte layer in contact with the anode active material layer may be in a range of about 0.05 μm Ra to about 0.6 μm Ra.

According to an aspect of an embodiment, the solid electrolyte may include $Li_{1+x+y}Al_xTi_{2-x}Si_yP_{3-y}O_{12}$ (where 0<x<2, and 0≤y<3), $BaTiO_3$, $Pb(Zr_{1-a}Ti_a)O_3$ (0≤a≤1) (PZT), $Pb_{1-x}La_xZr_{1-y}Ti_yO_3$ (PLZT) (where 0≤x<1, and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where 0<x<2, and 0<y<3), $Li_xAl_yTi_z(PO_4)_3$ (where 0<x<2, 0<y<1, and 0<z<3), $Li_{1+x+y}(Al_aGa_{1-a})_x(Ti_bGe_{1-b})_{2-x}Si_yP_{3-y}O_{12}$ (where 0≤x≤1, 0≤y≤1, 0≤a≤1, and 0≤b≤1), $Li_xLa_yTiO_3$ (where 0<x<2, and 0<y<3), $Li_2O$, $LiOH$, $Li_2CO_3$, $LiAlO_2$, a $Li_2O$—$Al_2O_3$—$SiO_2$—$P_2O_5$—$TiO_2$—$GeO_2$ ceramic, $Li_{3+x}La_3M_2O_{12}$ (where M=Te, Nb, Zr, or a combination thereof, and 0≤x≤10), $Li_7La_3Zr_{2-x}Ta_xO_{12}$ (LLZ-Ta where 0<x<2), or a combination thereof. The oxide-based solid electrolyte may include $Li_{1.3}Al_{0.3}Ti_{1.7}(PO_4)_3$, $Li_{0.34}La_{0.51}TiO_{2.94}$, $Li_{1.07}Al_{0.69}Ti_{1.46}(PO_4)_3$, $50Li_4SiO_4$–$50Li_2BO_3$, $90Li_3BO_3$–$10Li_2SO_4$, $Li_{2.9}PO_{3.3}N_{0.46}$, $Li_7La_3Zr_2O_{12}$, or a combination thereof.

According to an aspect of an embodiment, the solid electrolyte layer may further include a binder.

According to an aspect of an embodiment, the all-solid secondary battery may further include a lithium precipitation layer between the anode current collector and the anode active material layer, wherein the lithium precipitation layer may include lithium metal or a lithium alloy. A thickness of the lithium precipitation layer may be in a range of about 10 μm to about 60 μm. The anode layer may include an anode active material layer, and the solid electrolyte layer may be directly on the anode active material layer. In other words, a lithium precipitation layer may not be present between the solid electrolyte layer and the anode active material layer.

According to an aspect of an embodiment, the cathode layer may include a cathode active material layer, wherein the cathode active material layer may include a cathode active material, wherein the cathode active material may include lithium cobalt oxide, lithium nickel oxide, lithium nickel cobalt oxide, lithium nickel cobalt aluminum oxide, lithium nickel cobalt manganese oxide, lithium manganate, lithium iron phosphate, nickel sulfide, copper sulfide, lithium sulfide, sulfur (S), iron oxide, vanadium oxide, or a combination thereof. The cathode active material may include a lithium transition metal oxide having a layered structure and represented by one of Formulae 1 to 5:

$$Li_aNi_xCo_yM_zO_{2-b}A_b \qquad \text{Formula 1}$$

wherein in Formula 1,
1.0≤a≤1.2, 0≤b≤0.2, 0.3≤x<1, 0≤y≤0.3, 0<z≤0.3, and x+y+z=1,
M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or a combination thereof,
A is F, S, Cl, Br, or a combination thereof, $$LiNi_xCo_yMn_zO_2 \qquad \text{Formula 2}$$

$$LiNi_xCo_yAl_zO_2 \qquad \text{Formula 3}$$

wherein in Formula 2 or 3, x, y, and z are each independently 0.3≤x≤0.95, 0≤y≤0.2, 0<z≤0.2, and x+y+z=1, $$LiNi_xCo_yMn_vAl_wO_2 \qquad \text{Formula 4}$$

wherein in Formula 4, 0.3≤x≤0.95, 0≤y≤0.2, 0<v≤0.2, 0<w≤0.2, and x+y+v+w=1, $$Li_aCo_xM_yO_{2-b}A_b \qquad \text{Formula 5}$$

wherein In Formula 5,
1.0≤a≤1.2, 0≤b≤0.2, 0.9≤x≤1, 0≤y≤0.1, and x+y=1,
M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or a combination thereof, and
A is F, S, Cl, Br, or a combination thereof.

According to an aspect of an embodiment, the cathode layer may include a cathode active material layer, and the cathode active material layer may further include a second solid electrolyte. The second solid electrolyte may include an oxide-based solid electrolyte or a sulfide-based solid electrolyte, or a combination thereof.

According to an aspect of an embodiment, the cathode layer may include a cathode active material layer, wherein the cathode active material layer may include a liquid electrolyte. The anode layer and the solid electrolyte layer may not include a liquid electrolyte. The liquid electrolyte of the cathode active material layer may include an ionic liquid, a lithium salt, or a combination thereof.

According to an aspect of another embodiment, a method of preparing an all-solid secondary battery includes providing a solid electrolyte layer on a substrate; acid treating the solid electrolyte layer to provide an acid-treated solid electrolyte layer; and stacking the acid-treated solid electrolyte layer between a cathode layer and an anode layer such that a binding strength between the solid electrolyte layer and the anode layer is in a range of about 14 mN/mm to about 100 mN/mm.

According to an aspect of another embodiment, the method may further include polishing a surface of the solid electrolyte layer.

According to an aspect of another embodiment, the anode layer may include an anode current collector optionally in a plate form or a foil form; and an anode active material layer stacked on the anode current collector, wherein a film strength of the anode active material layer may be in a range of about 16 MPa to about 85 MPa.

According to an aspect of another embodiment, a method of charging an all-solid secondary battery may include charging the all-solid secondary battery beyond a charge capacity of the anode active material layer. The all-solid secondary battery may be charged such that a lithium precipitation layer precipitated in the anode layer has a thickness in a range of about 20 μm to about 60 μm.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, preferred embodiments will be described in further detail with reference to the appended drawings.

Note that, in this specification and the drawings, elements that have substantially the same function and structure are denoted with the same reference numerals, and repeated explanation of these elements is omitted.

1. Basic Structure of All-Solid Secondary Battery according to an Embodiment

Figure 1:
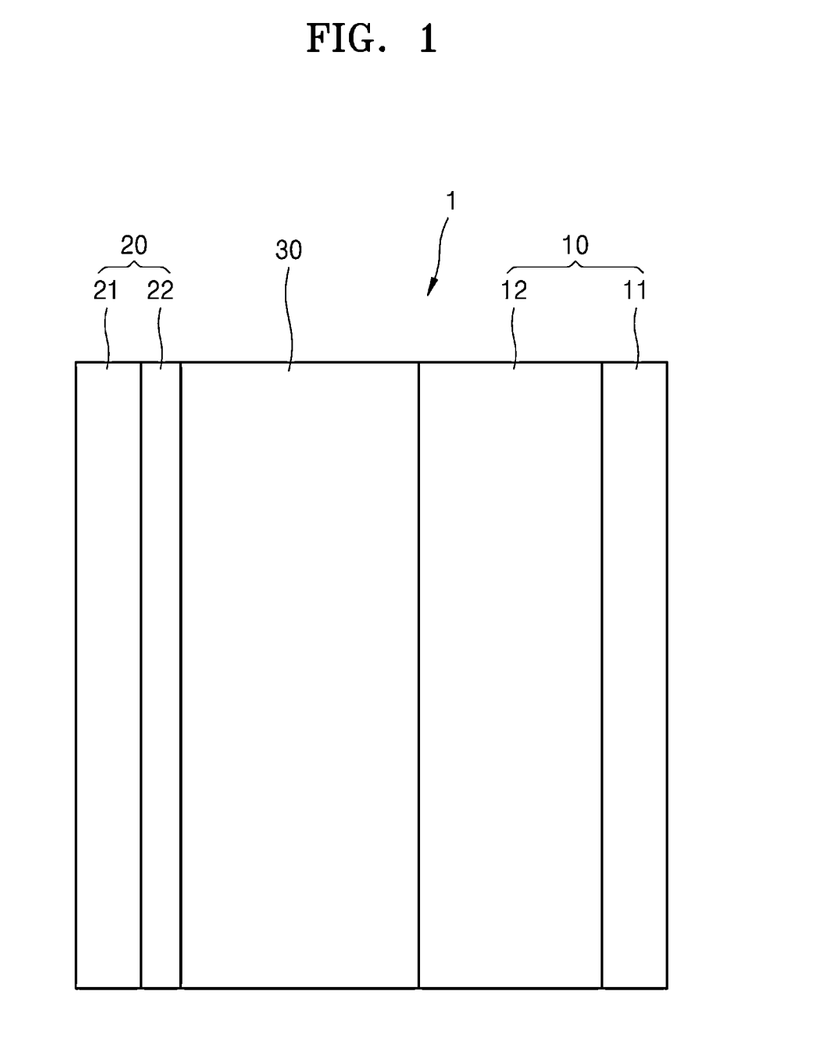
FIG. 1 is a cross-sectional view that shows a schematic structure of an embodiment of an all-solid secondary battery.

An embodiment of an all-solid secondary battery is an all-solid secondary battery 1 including a cathode layer 10, an anode layer 20, and a solid electrolyte layer 30 between the cathode layer 10 and the anode layer 20 as shown in FIG. 1.

1-1. Cathode Layer

The cathode layer 10 includes a cathode current collector 11 and a cathode active material layer 12. The cathode current collector 11 may have, for example, a plate structure or a foil structure formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 includes a cathode active material and a solid electrolyte. Also, the solid electrolyte in the cathode layer 10 may be an oxide-based solid electrolyte described in the context of the solid electrolyte layer 30 or a sulfide-based solid electrolyte.

The cathode active material may be any cathode active material capable of reversibly absorbing and desorbing lithium ions.

The cathode active material may include a lithium transition metal oxide, such as lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide, lithium iron phosphate, nickel sulfide, copper sulfide, lithium sulfide, sulfur (S), iron oxide, or vanadium oxide. One of these cathode active materials may be used alone, or a combination of at least two cathode active materials may be used as the cathode active material.

The cathode active material may include, for example, a compound that is represented by at least one of the following formulae: $Li_aA_{1-b}B'_bD_2$ (where $0.90 \le a \le 1$, and $0 \le b \le 0.5$); $Li_aE_{1-b}B'_bO_{2-c}D_c$ (where $0.90 \le a \le 1$, $0 \le b \le 0.5$, and $0 \le c \le 0.05$); $LiE_{2-b}B'_bO_{4-c}D_c$ (where $0 \le b \le 0.5$, and $0 \le c \le 0.05$); $Li_aNi_{1-b-c}Co_bB'_cD_\alpha$ (where $0.90 \le a \le 1$, $0 \le b \le 0.5$, and $0 \le c \le 0.05$, $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dGe_eO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$, and $0.001 \le b \le 0.1$); $Li_aCoG_bO_2$ (where $0.90 \le a \le 1$, and $0.001 \le b \le 0.1$); $Li_aMnG_bO_2$ (where $0.90 \le a \le 1$, and $0.001 \le b \le 0.1$); $Li_aMn_2G_bO_4$ (where $0.90 \le a \le 1$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); or $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. One of these cathode active materials may be used alone, or a combination of at least two cathode active materials may be used as the cathode active material.

The cathode active material compound may have a surface coating layer (hereinafter, also referred to as "coating layer"). Alternatively, a mixture of a compound without a coating layer and a compound having a coating layer, the compounds being selected from the compounds listed herein for the cathode active material, may be used. In some embodiments, the coating layer may include an oxide, hydroxide, oxyhydroxide, oxycarbonate, hydroxycarbonate, or a combination thereof of a coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The details of the coating methods may be determined by one of ordinary skill in the art without undue experimentation, and thus further detailed description thereof will be omitted.

Also, the cathode active material may include, for example, a lithium transition metal oxide that has a layered rock-salt type structure. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, in which a face-centered cubic (fcc) lattice, formed of anions and cations, is shifted by a half of each unit lattice.

The lithium transition metal oxide having the layered rock-salt type structure may include $LiNi_xCo_yAl_zO_2$ (NCA) (where $0 < x < 1$, $0 < y < 1$, $0 < z < 1$, and $x+y+z=1$) or a ternary lithium transition metal oxide expressed as $LiNi_xCo_yMn_zO_2$ (NCM) (where $0 < x < 1$, $0 < y < 1$, $0 < z < 1$, and $x+y+z=1$), or a combination thereof. Also, a lithium transition metal oxide having the layered rock-salt type structure may have a high content of nickel. For example, the lithium transition metal oxide may include a ternary lithium transition metal oxide having a high nickel content such as $LiNi_aCo_bAl_cO_2$ (where $0.5 < a < 1$, $0 < b < 0.3$, $0 < c < 0.3$, and $a+b+c=1$) or $LiNi_aCo_bMn_cO_2$ (where $0.5 < a < 1$, $0 < b < 0.3$, $0 < c < 0.3$, and $a+b+c=1$), or a combination thereof.

When the cathode active material includes a ternary lithium transition metal oxide having the layered rock-salt type structure, energy density and thermal stability of the all-solid secondary battery 1 may improve.

The cathode active material may be coated by, for example, a coating layer. The coating layer may be any suitable coating layer of a cathode active material of an all-solid secondary battery in the art. The coating layer may be, for example, $Li_2O$—$ZrO_2$.

When the cathode active material includes nickel (Ni) as a cathode active material, for example a ternary lithium transition metal oxide such as NCA or NCM as a cathode active material, a specific capacity of the all-solid secondary battery 1 may be increased, and thus metal elution from the cathode active material in a charged state may be reduced. As a result, the all-solid secondary battery 1 according to an embodiment may have enhanced long-term reliability in a charged state and improved cycle characteristics.

A shape of the cathode active material may be, for example, particle shapes such as a spherical shape or an elliptical shape. Also, a particle diameter of the cathode active material is not particularly limited but may be in a range applicable to a cathode active material of an all-solid secondary battery. An amount of the cathode active material of the cathode 10 is not particularly limited and may be in a range applicable to a cathode layer of a conventional all-solid secondary battery.

Additives such as a conducting agent, a binder, a filler, a dispersant, an ion conducting agent, or a combination thereof may be added to the cathode active material layer 12 in addition to the cathode active material and the solid electrolyte.

Examples of the conducting agent that may be added to the cathode active material layer 12 may include graphite, carbon black, acetylene black, KETJEN black, carbon fiber, metal powder, or a combination thereof. Examples of the binder that may be added to the cathode active material layer 12 may include styrene butadiene rubber (SBR), polytetrafluoroethylene, polyvinylidene fluoride, polyethylene, or a combination thereof. The filler, the dispersant, and the ion conducting agent may be appropriately added to the cathode active material layer 12 and may be commercially available materials that are used in an electrode of an all-solid secondary battery in the art. The sulfide-based solid electrolyte in the cathode active material layer 12 may be, for example, $Li_2S$—$P_2S_5$, $Li_2S$—$P_2S_5$—LiX (where X is a halogen such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each independently a positive number, and Z is Ge, Zn, or Ga, or a combination thereof), $Li_2S$—$GeS_2$, $Li_2S$—$SiS_2$—$Li_3PO_4$, or $Li_2S$—$SiS_2$—$Li_pMO_q$ (where p and q are each independently a positive number of 1 to 20, and M is one of P, Si, Ge, B, Al, Ga, and In). The solid electrolyte may comprise one type of sulfide-based solid electrolyte materials or at least two types of the sulfide-based solid electrolyte material.

The sulfide-based solid electrolyte in the cathode active material layer 12 may include sulfur (S), phosphorus (P), and lithium (Li), as component elements. In particular, the sulfide-based solid electrolyte may be a material including $Li_2S$—$P_2S_5$. When a material including $Li_2S$—$P_2S_5$ is used as the sulfide-based solid electrolyte, a mixing molar ratio of $Li_2S$ and $P_2S_5$ ($Li_2S$:$P_2S_5$) may be, for example, selected in a range of about 50:50 to about 90:10. The sulfide-based solid electrolyte may be amorphous or crystalline. The sulfide-based solid electrolyte may be a mixture of amorphous and crystalline materials. The sulfide-based solid electrolyte may include, for example, $Li_7P_3S_{11}$, $Li_7PS_6$, $Li_4P_2S_6$, $Li_3PS_6$, $Li_3PS_4$, $Li_2P_2S_6$, or a combination thereof.

The sulfide-based solid electrolyte may include, for example, an argyrodite-type solid electrolyte represented by Formula 6:

$$Li^+{}_{12-n-x}A^{n+}X^{2-}{}_{6-x}Y'^-{}_x.\qquad \text{Formula 6}$$

In Formula 6, A is P, As, Ge, Ga, Sb, Si, Sn, Al, In, Ti, V, Nb, or Ta, X is S, Se, or Te, or a combination thereof, Y' is Cl, Br, I, F, CN, OCN, SCN, or $N_3$, or a combination thereof, $2 \le n \le 5$, and $0 \le x \le 2$.

For example, the argyrodite-type solid electrolyte may be $Li_{7-x}PS_{6-x}Cl_x$ (where $0 \le x \le 2$), $Li_{7-x}PS_{6-x}Br_x$ (where $0 \le x \le 2$), $Li_{7-x}PS_{6-x}I_x$ (where $0 \le x \le 2$), or a combination thereof. For example, the argyrodite-type solid electrolyte may be $Li_6PS_5Cl$, $Li_6PS_5Br$, $Li_6PS_5I$, or a combination thereof.

The cathode active material layer 12 may further include a liquid electrolyte. In the all-solid secondary battery according to an embodiment, when the cathode active material layer 12 further includes a liquid electrolyte, the liquid electrolyte may be omitted from the anode layer 20 and the solid electrolyte layer 30. That is, in an aspect, a liquid electrolyte is only in the cathode layer 10 and is not intentionally added to or included in the anode layer 20 or the solid electrolyte layer 30. The liquid electrolyte may include, for example, an ionic liquid, a lithium salt such as $LiPF_6$, or a combination thereof. The liquid electrolyte may include an anhydrous solvent, such as a carbonate, such as ethylene carbonate and dimethyl carbonate.

1-2. Anode Layer

The anode layer 20 includes an anode current collector 21 and an anode active material layer 22 stacked on the anode current collector 21. The anode current collector 21 may be formed of a material that does not react with lithium, e.g., a material that does not form either an alloy or a compound with lithium. Examples of the material for the anode current collector 21 may include copper (Cu), stainless steel, titanium (Ti), iron (Fe), cobalt (Co), or nickel (Ni). The anode current collector 21 may be formed of at least one of the examples of the metal or an alloy or a clad material of at least two metals. The anode current collector 21 may be in the form of a plate or a foil.

The anode active material layer 22 may include an anode active material.

The anode active material may include, for example, an alloy-forming element that forms an alloy or a compound with lithium by an electrochemical reaction with amorphous carbon during charging. The alloy-forming element may be, for example, gold, platinum, palladium, silicon, silver, aluminum, bismuth, tin, zinc, or a combination thereof. Here, amorphous carbon may be, for example, carbon black or graphene. Examples of the carbon black may include acetylene black, furnace black, or KETJEN black. Also, for improvement of electronic conductivity, the alloy-forming element, e.g., silicon, may be coated with a carbon layer in a thickness in a range of about 1 nanometer (nm) to about 10 nm, or about 2 nm to about 8 nm.

A nitrogen adsorption specific surface area of amorphous carbon as the anode active material may be, for example, in a range of about 1 square meter per gram ($m^2/g$) to about 500 $m^2/g$, about 10 $m^2/g$ to about 450 $m^2/g$, about 25 $m^2/g$ to about 400 $m^2/g$, or about 50 $m^2/g$ to about 300 $m^2/g$.

Here, when the amorphous carbon in the anode active material layer 22 is one type of carbon, the "nitrogen adsorption specific surface area" of amorphous carbon as the anode active material refers to a nitrogen adsorption specific surface area of the corresponding amorphous carbon prior to lithiation. Also, when the amorphous carbon in the anode active material layer 22 is a plurality of types, the "nitrogen adsorption specific surface area" of amorphous carbon refers to a weighted average of a nitrogen adsorption specific surface area of each of the plurality of types.

The nitrogen adsorption specific surface area of the amorphous carbon in the anode active material layer 22 may be measured by a nitrogen adsorption method (Japanese Industry Standards (JIS) K6217-2:2001). For example, amorphous carbon such as carbon black, which has been degassed once at a high temperature of about 300° C., is cooled to a liquid nitrogen temperature in a nitrogen atmosphere. In addition, the value of the nitrogen adsorption specific surface area may be calculated by measuring the mass increase (nitrogen adsorption amount) of a carbon sample and a nitrogen atmosphere pressure after reaching the equilibrium state and applying these to the Brunauer-Emmett-Teller (BET) equation.

Here, when gold, platinum, palladium, silicon, silver, aluminum, bismuth, tin, zinc, or a combination thereof is used as the alloy-forming element, the anode active material may be, for example, in the form of particles, and a particle diameter of the particles may be about 4 micrometers (μm) or less, more preferably, about 300 nanometers (nm) or less. The particle diameter of the anode active material may be, for example, in a range of about 10 nm to about 4 μm, about 10 nm to about 1 μm, about 10 nm to about 500 nm, or about 10 nm to about 300 nm. In this case, characteristics of the all-solid secondary battery 1 may further be improved. Here, the particle diameter of the anode active material may be, for example, a median diameter (D50) measured using a laser light scattering with a particle size distribution analyzer.

The anode active material layer 22 may further include an additive such as a binder, a filler, a dispersant, an ion conducting agent, or a combination thereof used in an all-solid secondary battery of the related art.

1-3. Solid Electrolyte Layer

The solid electrolyte layer 30 includes a solid electrolyte between the cathode layer 10 and the anode layer 20.

As the solid electrolyte in the present embodiment, use of an oxide, phosphate, borate, sulfate, oxynitride, or a combination thereof may be used.

The solid electrolyte may be crystalline or amorphous. Also, the oxide-based solid electrolyte may be a mixture of crystalline and amorphous materials.

The solid electrolyte may include, for example, $Li_{1+x+y}Al_xTi_{2-x}Si_yP_{3-y}O_{12}$ (where $0<x<2$, and $0\leq y<3$), $BaTiO_3$, $Pb(Zr_{1-a}Ti_a)O_3$ ($0\leq a\leq 1$) (PZT), $Pb_{1-x}La_xZr_{1-y}Ti_yO_3$ (PLZT) (where $0\leq x<1$, and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$, and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq 1$, $0\leq y\leq 1$, $0\leq a\leq 1$, and $0\leq b\leq 1$), $Li_xLa_yTiO_3$ (where $0<x<2$, and $0<y<3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (where M=Te, Nb, Zr, or a combination thereof and $0\leq x\leq 10$), $Li_7La_3Zr_{2-x}Ta_xO_{12}$ (LLZ-Ta, where $0<x<2$), or a combination thereof. The oxide-based solid electrolyte may be, for example, $Li_{1.3}Al_{0.3}Ti_{1.7}(PO_4)_3$, $Li_{0.34}La_{0.51}TiO_{2.94}$, $Li_{1.07}Al_{0.69}Ti_{1.46}(PO_4)_3$, $50Li_4SiO_4$-$50Li_2BO_3$, $90Li_3BO_3$-$10Li_2SO_4$, $Li_{2.9}PO_{3.3}N_{0.46}$, or $Li_7La_3Zr_2O_{12}$, or a combination thereof.

The solid electrolyte layer 30 may further include a binder. The binder in the solid electrolyte layer 30 may be, for example, styrene butadiene rubber (SBR), polytetrafluoroethylene, polyvinylidene fluoride, polyethylene, or a combination thereof. The binder in the solid electrolyte layer 30 may be identical to or different from the binder in the cathode active material layer 12 and the anode active material layer 22.

Also, in the present embodiment, the solid electrolyte layer 30 may only include the oxide-based solid electrolyte as a solid electrolyte. In addition, the solid electrolyte 30 of the present embodiment can be formed of only the solid electrolyte, which is an oxide, phosphate, borate, sulfate, an oxynitride, or a combination thereof.

1-4. Relationship between Charge Capacities of Cathode Layer and Anode Layer

In the all-solid secondary battery 1 according to an embodiment, a ratio of a charge capacity of the cathode active material layer 12 to a charge capacity of the anode active material layer 22, i.e., a capacity ratio satisfies the condition of the following Expression 1.

$$0.01 < b/a < 0.5 \quad (1)$$

wherein a is a charge capacity of the cathode active material layer 12 (milliampere-hours, mAh), and b is a charge capacity of the anode active material layer 22 (mAh).

The capacity ratio may be, for example, $0.01<b/a\leq 0.45$, $0.01<b/a\leq 0.4$, $0.02\leq b/a\leq 0.3$, $0.03\leq b/a\leq 0.25$, $0.03\leq b/a\leq 0.2$, or $0.05\leq b/a\leq 0.1$.

Here, the charge capacity of the cathode active material layer 12 may be obtained by multiplying a mass of a cathode active material in the cathode active material layer 12 by a charge specific capacity (milliampere-hours per gram, mAh/g) of the cathode active material. When a plurality of materials are used as the cathode active material, a weighted average may be used, e.g., a value of charge specific capacity×mass of each of the materials is calculated, and the sum of the values may be referred to as a charge capacity of the cathode active material layer 12. A charge capacity of the anode active material layer 22 is calculated in the same manner. That is, the charge capacity of the anode active material layer 22 may be obtained by multiplying a mass of an anode active material in the anode active material layer 22 by a charge specific capacity (mAh/g) of the anode active material. When a plurality of materials are used as the anode active material, weighted average may be used, e.g., a value of charge specific capacity×mass of each of the materials is calculated, and the sum of the values may be referred to as a charge capacity of the anode active material layer 22. Here, the charge specific capacity of the cathode active material layer 12 and the anode active material layer 22 are capacities estimated using an all-solid half-cell using lithium metal as a counter electrode. In practice, the charge capacities of the cathode active material layer 12 and the anode active material layer 22 are directly measured using the all-solid half-cell.

Examples of a method of directly measuring a charge capacity may include the following methods. First, the charge capacity of the cathode active material layer 12 is measured by manufacturing an all-solid half-cell using the cathode active material layer 12 as a working electrode and lithium as a counter electrode, and performing constant current-constant voltage (CC-CV) charging from an open circuit voltage (OCV) to an upper-limit charge voltage. The upper-limit charge voltage is set by the standard of JIS C 8712:2015 refers to 4.25 volts (V) regarding a lithium cobalt oxide-based cathode and a voltage that may be obtained by applying the standard of A.3.2.3 (safety requirements when other upper-limit charge voltage is applied) of JIS C 8712: 2015 for other cathodes. The charge capacity of the cathode active material layer 22 is measured by manufacturing an all-solid half-cell using the anode active material layer 22 as a working electrode and lithium as a counter electrode, and performing CC-CV charging from an open circuit voltage (OCV) to 0.01 V.

The test cell (i.e., the all-solid half cell) may be prepared, for example, according to the following method. The cathode active material layer 12 or the anode active material layer 22 for measuring the charge capacity are perforated in a disk shape having a diameter of 13 millimeters (mm). 200 milligrams (mg) of a solid electrolyte powder identical to that used in the all-solid secondary battery 1 is pressed at 40 megaPascals (MPa) to form a pellet having a diameter of 13 mm and a thickness of about 1 mm. The pellet is put into a tube having an inner diameter of 13 mm, the cathode active material layer 12 or the anode active material layer 22 perforated in a disk shape is added through one side of the tube, and a lithium foil having a diameter of 13 mm and a thickness of 0.03 mm is added from the opposite side of the tube. Also, one stainless steel disk is added through each of both sides of the tube, and the assembly is pressed in the axial direction of the tube at 300 MPa for 1 minute to integrate the contents. The integrated contents are taken out of the tube, placed in a case to which a pressure of 22 MPa is constantly applied, and the case is sealed, thereby obtaining a test cell. The measurement of the charge capacity of the cathode active material layer 12 may be performed by constant current (CC) charging the test cell prepared as described above, for example, at a current density of 0.1 milliAmperes (mA) and then constant voltage (CV) charging until 0.02 mA.

Accordingly, the measured charge capacity is divided by a mass of each of the active materials to calculate a charge specific capacity. An initial charge capacity of the cathode active material layer 12 and the anode active material layer 22 may be an initial charge capacity, e.g., first charge, measured during charging of the first cycle. This is used in the Examples described later.

Figure 2:
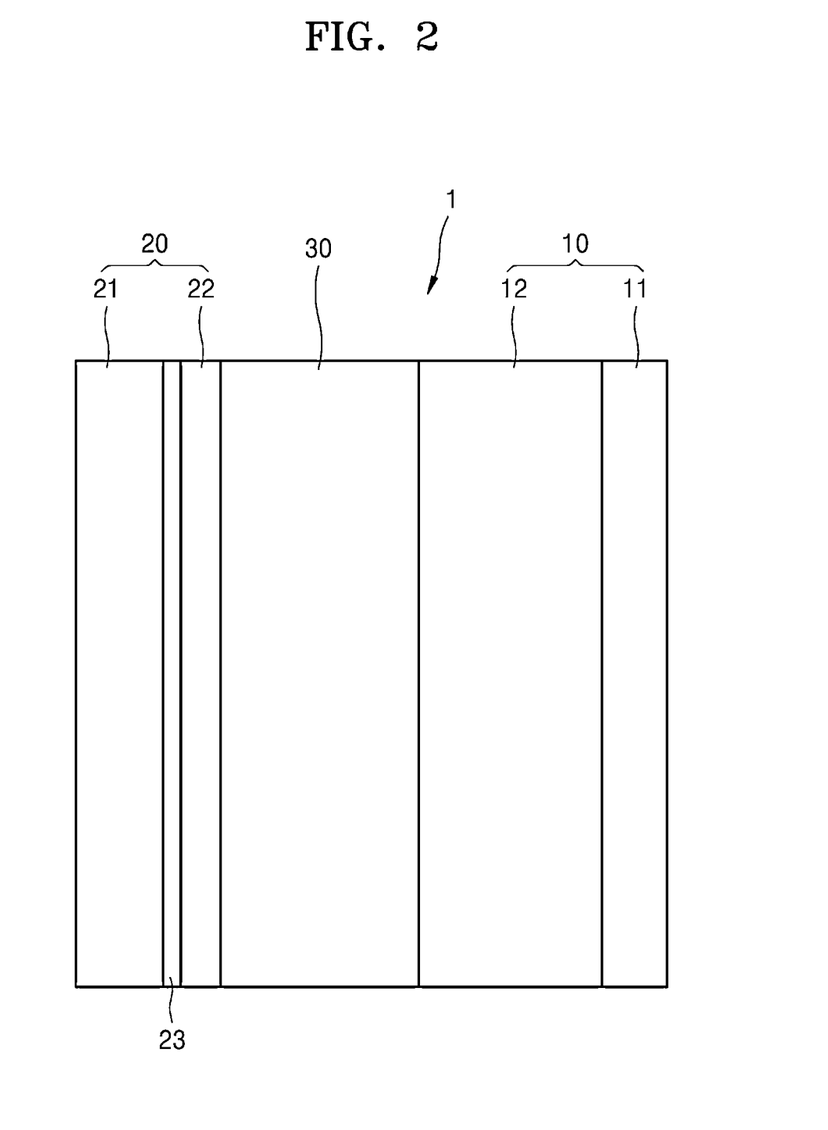
FIG. 2 is a cross-sectional schematic view that shows precipitation of lithium when an all-solid secondary battery according to an embodiment is charged.

In this regard, the charge capacity of the cathode active material layer 12 with respect to the charge capacity of the anode active material layer 22 is set to be excessive. In the present embodiment, the all-solid secondary battery 1 is charged beyond a charge capacity of the anode active material layer 22. That is, the anode active material layer 22 is overcharged. In the initial charging, lithium is absorbed in the anode active material layer 22. That is, the anode active material forms an alloy with lithium ions migrated from the cathode layer 10. When the all-solid secondary battery 1 is further charged beyond a capacity of the anode active material layer 22, as shown in FIG. 2, lithium is precipitated on a back surface of the anode active material layer 22, i.e., between the anode current collector 21 and the anode active material layer 22, and thus a lithium precipitation layer 23 comprising lithium metal is formed. The lithium precipitation layer 23 may comprise a trace amount of elements other than lithium but is mainly formed of lithium (mainly lithium metal). As used herein, a trace amount means an amount of less than about 5,000 ppm, less than about 1,000 ppm, less than about 500 ppm, or less than 100 ppm based on the total weight of the lithium precipitation layer 23.

This phenomenon occurs as the anode active material includes a particular material, i.e., an alloy-forming element that forms an alloy or a compound with lithium. During discharge, lithium in the anode active material layer 22 and the lithium precipitation layer 23 is ionized and migrates toward the cathode layer 10.

Therefore, the all-solid secondary battery 1 according to an embodiment may use the precipitated lithium as an anode active material. Also, since the anode active material layer 22 covers the lithium precipitation layer 23, the anode active material layer 22 may function as a protection layer of the lithium precipitation layer and at the same time may suppress precipitation and growth of lithium dendrites. In this regard, a short-circuit and a decrease in capacity of the all-solid secondary battery 1 may be suppressed, and characteristics of the all-solid secondary battery 1 may be improved.

The capacity ratio b/a is greater than 0.01. When the capacity ratio is about 0.01 or less, characteristics of the all-solid secondary battery 1 may be deteriorated. For this reason, the anode active material layer 22 may not sufficiently function as a protection layer. For example, when a thickness of the anode active material layer 22 is very thin, the capacity ratio may be about 0.01 or less. In this case, the anode active material layer 22 may collapse by the repeated charging and discharging, and thus lithium dendrites may precipitate and grow. As a result, characteristics of the all-solid secondary battery 1 may be deteriorated. In JP-A-2019-096610, and while not wanting to be bound by theory, it is believed that characteristics of the all-solid secondary battery are not sufficiently improved because an interlayer or a carbon layer is too thin, which is why a battery as disclosed in JP-A-2019-096610 does not provide suitable charge/discharge properties. Also, the capacity ratio may be lower than about 0.5. When the capacity ratio is about 0.5 or greater, a precipitation amount of lithium in an anode may be reduced, and battery capacity may be decreased. For the same reason, the capacity ratio may be less than about 0.25. Also, when the capacity ratio is less than 0.25, output characteristics of the battery may further be improved.

A thickness of the anode active material layer 22 is not particularly limited as long as the condition of Expression (1) is satisfied and the thickness may be, for example, in a range of about 1 μm to about 20 μm, about 1.5 μm to about 15 μm, about 1 μm to about 10 μm, or about 2 μm to about 10 μm.

When the thickness of the anode active material layer 22 is less than about 1 μm, characteristics of the all-solid secondary battery 1 may not be sufficiently improved. When the thickness of the anode active material layer 22 is greater than about 20 μm, a resistance value of the anode active material layer 22 increases, which may result in insufficient improvement of characteristics of the all-solid secondary battery 1.

The thickness of the anode active material layer 22 may be estimated, for example, by observing an average thickness of a cross-section of the anode active material layer 22 through a scanning electron microscope (SEM) after assembling and press-molding the all-solid secondary battery 1.

2. Feature Structure of All-Solid Secondary Battery according to an Embodiment

The all-solid secondary battery 1 according to an embodiment is featured in having a binding strength between the anode active material layer 22 and the solid electrolyte layer 30 in a range of about 14 milliNewtons per millimeter (mN/mm) to about 100 mN/mm. The binding strength may be, for example, in a range of about 14 mN/mm to about 98 mN/mm or about 20 mN/mm to about 61 mN/mm.

The binding strength between the anode active material layer 22 and the solid electrolyte layer 30 may be determined by measuring a peel strength using AGS-X manufactured by Shimadzu. Peel strength may be determined according to ASTM D903.

There may be many methods to control the binding strength between anode active material layer 22 and the solid electrolyte layer 30 within these ranges. An example of the methods to control the binding strength may be a method using a surface roughness of the solid electrolyte layer 30, for example, use of a surface roughness (Sa, arithmetic mean height of the surface, areal roughness parameter) in a range of about 0.05 μm Sa to about 0.6 μm Sa, about 0.01 μm Sa to about 0.5 μm Sa, or about 0.2 μm Sa to about 0.4 μm Sa. In this regard, by controlling a surface roughness of a contact surface of the solid electrolyte layer 30 to the anode active material layer 22, a contact area between the solid electrolyte layer 30 and the anode active material layer 22 may increase, and thus a binding strength therebetween may also be improved. The surface roughness of the solid electrolyte layer 30 may be controlled by the polishing conditions of the solid electrolyte layer 30 or by an extent of acid treatment that will be described later. The extent of acid treatment may be, for example, controlled by changing a concentration of acid being used, treatment time, or treatment temperature.

A film strength of the anode active material layer 22 of the all-solid secondary battery 1 according to an embodiment may be in a range of about 16 MPa to about 85 MPa, or about 18 MPa to about 82 MPa.

The film strength of the anode active material layer 22 may be measured by measuring a shear strength of the anode active material layer using SAICAS manufactured by Daipla Wintes Co., Ltd. A thickness of the anode active material layer for measuring a shear strength of the anode active material layer may be 1 μm to 500 μm. Movement conditions of cutting blade may be controlled with a ratio of horizontal moving velocity: vertical moving velocity to be 10:1. Further, moving conditions of cutting blade may be controlled to horizontally at 1 to 50 μm/sec and vertically at 0.1 to 5 μm/sec.

The film strength of the anode active material layer 22 may be controlled by, for example, adjusting a type of amorphous carbon included as the anode active material, a type of the binder, or an amount of the binder, or a combination thereof, in the anode active material layer 22. For example, when a material having a relatively large specific surface area is used as the amorphous carbon, the number of binders binding to one amorphous carbon tends to increase, and thus an amount of the binder can be to be increased to maintain the film strength. Also, when a string-shaped binder having a large molecular weight is used, even when the amount of the binder is reduced to a low level, the binders or the binder and the amorphous carbon may easily adhere to each other, and thus the film strength may tend to increase.

In the present embodiment, examples of the binder used in the anode active material layer 22 may include styrene butadiene rubber (SBR), polytetrafluoroethylene, polyvinylidene fluoride, polyethylene, or polymethylmethacrylate (PMMA). One of these binders may be used alone, or a combination of at least two binders may be used as the binder.

An amount of the binder in the anode active material layer 22 for implanting the selected film strength is in a range of about 0.05 weight % (wt %) to about 30 wt %, or about 3 wt % to about 20 wt %, based on the total weight of the anode active material layer 22.

The anode active material layer 22 may include the alloy-forming element in an amount ranging from about 5 wt % to about 25 wt %, and the amorphous carbon in an amount ranging from about 50 wt % to about 90 wt %, each based on a weight of the anode active material layer 22. The anode active material layer 22 may include the alloy-forming element in an amount ranging from about 8 wt % to about 23 wt % and the amorphous carbon in an amount ranging from about 60 wt % to about 86 wt %, each based on a weight of the anode active material layer 22.

3. Method of Preparing All-Solid Secondary Battery according to an Embodiment

Subsequently, a method of preparing the all-solid secondary battery 1 according to an embodiment will be described. The all-solid secondary battery 1 according to an embodiment may be prepared by first separately preparing a cathode layer 10, an anode layer 20, and a solid electrolyte layer 30 and then stacking the cathode layer 10, the anode layer 20, and the solid electrolyte layer 30.

3-1. Preparation Process of Cathode Layer

First, materials for a cathode active material layer (a cathode active material, a binder, etc.) are mixed to prepare a mixture, the mixture is stacked on a cathode current collector 11 to obtain a stack, and the stack is pressed (e.g., pressed under an isostatic pressure) to prepare the cathode layer 10. The pressing process may be omitted. The mixture of the materials for a cathode active material layer may be compressed into the form of a pellet or stretched in the form of sheet to prepare the cathode layer 10. When the cathode layer 10 is prepared in this manner, the cathode current collector 11 may be compressed to the pellet or sheet thus prepared. The cathode active material layer 12 may be formed by coating a slurry prepared by adding the materials for a cathode active material layer in a non-polar solvent (where the slurry may be in the form of paste as well as other slurries) on the cathode current collector 11 and drying the resultant.

3-2. Preparation Process of Anode Layer

First, materials for an anode active material layer (an anode active material, an alloy-forming element, a binder, etc.) constituting an anode active material layer 22 are added to a polar solvent or a non-polar solvent to prepare a slurry. Then, the slurry is coated and dried on an anode current collector 21 to prepare a stack. Subsequently, the prepared stack is pressed (e.g., pressed under an isostatic pressure) to prepare an anode layer 20. The pressing process may be omitted. Also, an anode active material layer 22 may be separately formed, stacked on the anode current collector 12, and pressed to prepare the anode layer 20.

3-3. Preparation Process of Solid Electrolyte Layer

A solid electrolyte layer 30 may be prepared, for example, according to the following steps or processes.

The solid electrolyte layer 30 is prepared by mixing starting materials to obtain a mixture and sintering the mixture at a high temperature. A high temperature can be a temperature of about 700° C. to about 1500° C., about 800° C. to about 1400° C., or about 900° C. to about 1250° C. Here, for example, a method of preparing the solid electrolyte layer 30 formed of a sintered product of a garnet-type oxide will be described.

In the mixing process, materials including at least a Li component, a La component, and a Zr component as the starting materials are mixed to obtain a mixture. The components in the mixture have a component ratio for obtaining a lithium ion conducting ceramic material having a garnet-type crystal structure or a crystal structure similar to a garnet-type crystal structure.

For example, a sintering aid such as boron oxide is added to the mixing material and mixed with a ball mill or a jet mill to obtain a precursor powder.

The precursor powder thus obtained is put into a mold and press-molded to obtain a precursor pellet.

Subsequently, in the sintering process, the molded precursor pellet is heated to a temperature in a range of about 900° C. to about 1250° C. for about 1 hour to about 36 hours. Here, the sintering temperature or the sintering time may be appropriately changed according to the mixing ratio of the materials.

The heating method is not particularly limited, and resistance heating or microwave heating may be used. The sintering process may be performed in two stages of pre-sintering and sintering, and the molding process may be included in the sintering process to use electric current sintering or discharge plasma sintering.

In the present embodiment, a surface of the solid electrolyte layer 30 prepared in this manner is acid-treated.

The acid treatment may be performed, for example, using phosphoric acid. A concentration of the phosphoric acid used in the acid treatment may be in a range of about 1 mole per liter (mol/L) to about 10 mol/L or about 5 mol/L to about 6 mol/L. A temperature of the acid treatment may be in a range of about 20° C. to about 60° C. or about 30° C. to about 55° C. A time for the acid treatment may be in a range of about 5 seconds to about 10 minutes, about 30 seconds to about 5 minutes, or about 1 minute to about 2 minutes. The concentration, temperature, or time for the acid treatment may be appropriately changed according to materials used in the solid electrolyte layer 30.

The surface of the solid electrolyte layer 30 may be polished before the acid treatment to control a surface roughness, e.g., Sa. By performing the polishing process, a degree of brittleness of the solid electrolyte layer 30 may be weakened as compared with a case when the surface roughness of the solid electrolyte layer 30 is only controlled by acid treatment.

The polishing of the solid electrolyte layer 300 may include, for example, polishing the solid electrolyte layer 300 with abrasive paper of #280 to #5000 and then finish polishing with a wrapping film of #300 to #10000. The abrasive paper may be #300 to #2000 or #600 to #1500. The wrapping film in the finishing polishing process may be #400 to #4000 or #600 to #2000.

3-4. Assembly Process of All-Solid Secondary Battery

The cathode layer 10, the anode layer 20, and the solid electrolyte layer 30 prepared as described above are stacked such that the solid electrolyte layer 30 is between the cathode layer 10 and the anode layer 20, and the stack is pressed (e.g., pressed under an isostatic pressure) to manufacture an all-solid secondary battery 1 according to an embodiment.

When the all-solid secondary battery 1 manufactured using the method is operated, the operation may be performed while a pressure is applied to the all-solid secondary battery 1.

The pressure may be in a range of about 0.5 MPa to about 10 MPa. Also, the application of the pressure may be performed by placing the stack between two rigid plates of stainless steel, aluminum, or glass and fastening the two plates with screws.

4. Method of Charging All-Solid Secondary Battery according to an Embodiment

Subsequently, a method of charging the all-solid secondary battery 1 will be described. In the present embodiment, as described above, the all-solid secondary battery 1 is charged beyond a charge capacity of the anode active material layer 22. That is, the anode active material layer 22 is overcharged. In an initial charging state, lithium is absorbed in the anode active material layer 22. Lithium is precipitated on a back surface of the anode active material layer 22, that is, between the anode current collector 21 and the anode active material layer 22, and due to the precipitation of lithium, a lithium precipitation layer 23, which was not present during the preparation of the all-solid secondary battery 1, is formed. During discharging, lithium in the anode active material layer 22 and the lithium precipitation layer 23 is ionized and moves toward the cathode layer 10.

Also, an amount of charging may be a value in a range of about 2 times to about 100 times or, for example, about 4 times to about 100 times the charge capacity of the anode active material layer 22.

A thickness of the lithium precipitation layer 23 precipitated in the anode layer 20 during charging may be about 10 μm or more or, for example, about 20 μm or more, and may be within a range of about 60 μm or less, e.g., about 10 μm to 100 μm, or 20 μm to 50 μm, as an upper-limit for implementing an all-solid secondary battery. Also, the thickness of the lithium precipitation layer 23 may be estimated by observing an average thickness of a cross-section of the all-solid secondary battery 1 after charging through a scanning electron microscope (SEM).

5. Effect of the Present Embodiment

In the all-solid secondary battery 1 prepared as described above, a binding strength between the anode active material 22 and the solid electrolyte layer 30 may be in a range of about 20 mN/m to about 100 mN/mm, and thus precipitation of lithium (or plating of lithium) between the anode active material layer 22 and the solid electrolyte layer 30 may be suppressed by overcharging the anode active material layer 22.

Also, since the film strength of the anode active material layer is in a range of about 16 MPa to about 85 MPa, precipitation of lithium in the anode active material layer 22 may be suppressed.

As described above, lithium may be selectively precipitated only between the anode active material layer 22 and the anode current collector 21 when the all-solid secondary battery 1 according to an embodiment is used. As a result, the anode active material layer 22 may function as a protection layer of the lithium precipitation layer 23 between the anode current collector 21 and the anode active material layer 22, and precipitation and growth of lithium dendrites may further be effectively suppressed.

In the same reason described above, a short-circuit and a decrease in capacity of the all-solid secondary battery 1 according to an embodiment may be suppressed, and characteristics of the all-solid secondary battery 1 may be improved.

As used herein, the solid electrolyte layer is not limited to a solid electrolyte layer including only the solid electrolyte as disclosed herein, e.g., an oxide, phosphate, borate, sulfate, an oxynitride, or a combination thereof, but may include the solid electrolyte and a binder. As the solid electrolyte, use of an oxide is mentioned.

In the embodiment above, the all-solid secondary battery includes the all solid cathode layer, anode layer, and solid electrolyte layer, and the embodiment may be applied to any all-solid secondary battery having a solid anode layer and a solid electrolyte layer. For example, the embodiment may be applied to an all-solid secondary battery in which a part of or the whole cathode layer is not solid or an all-solid secondary battery including an electrolyte solution, e.g., liquid electrolyte, in addition to a solid electrolyte. One or more embodiments will now be described in more detail with reference to the following examples. However, these examples are not intended to limit the scope of the one or more embodiments.

EXAMPLES

The all-solid secondary battery according to an embodiment will be described in further detail with reference to Examples and Comparative Examples, but embodiments are not limited thereto.
Preparation of All-Solid Secondary Battery
Preparation of Anode Layer Regarding each of the Examples and Comparative Examples, a mixed particle thin film of a silver (Ag) and carbon or a mixed particle thin film of silicon (Si) and carbon was used as an anode active material, and the anode active material was prepared as follows.

Silver or silicon had a particle diameter of about 80 nm, and carbon black (two types, CB-1 and CB-2) available from Asahi Carbon Co., Ltd. and acetylene black (AB) available from Denka were used as the carbon. Six (6) grams (g) of carbon and 2 g of silver particles (or silicon particles) were put into a container, a N-methyl-2-pyrrolidone (NMP) solution including a binder was added thereto, and the mixture was stirred while slowly adding NMP to prepare a slurry. The slurry was applied on an anode current collector formed of stainless steel (SUS) having a thickness of about 10 μm using a blade coater, dried in the air at about 80° C., and then vacuum dried at about 100° C. for about 12 hours to prepare an anode layer. As the binder, one of polyvinylidene fluoride (PVDF), polymethylmethacrylate (PMMA), or styrene butadiene rubber (SBR) was used. In Examples 1 to 16 and Comparative Examples 1 and 2, compositions of the anode active material layer are shown in Table 1. In Table 1, values in the column of the compositions of the anode active material layer represent a weight ratio of each component. Also, a specific surface area of the carbon, CB-1, is about 50 square meters per gram ($m^2/g$), a specific surface area of the carbon, CB-2, is about 300 $m^2/g$, and a specific surface area of AB is about 50 $m^2/g$.
Preparation of Solid Electrolyte Layer In a solid electrolyte layer, a pellet of an oxide-based solid electrolyte (LLZO) was used. The pellet was treated with 5 moles per liter (mol/L) of phosphoric acid for 1 minute ($Li_7La_3Zr_{2-x}Ta_xO_{12}$ (LLZ-Ta, where 0<x<2), available from Toshima) and vacuum dried.

Also, in Examples 15 and 16, the solid electrolyte was polished before the acid treatment. In particular, the solid electrolyte was polished with a polishing paper of #1000 and finish polished using a wrapping film of #600. The numbers (#) of the polishing paper and wrapping film are not limited thereto, and the same effect may be obtained using the polishing paper and wrapping film of a number (#) within a range of about ±20% of these numbers (#).
Preparation of Cathode Layer $LiNi_{0.8}Co_{0.15}Al_{0.05}O_2$ (NCA) as a cathode active material, $Li_6PS_5Cl$ as a solid electrolyte, carbon nanofiber as a conducting agent, and a polytetrafluoroethylene (PTFE) binder (available from Daikin) as a binder were mixed at a weight ratio as follows: cathode active material:solid electrolyte:CNF:PTFE binder=88:12:2:1, and the mixture was stretched to a sheet form and used as a cathode active material layer. An aluminum foil having a thickness of about 10 μm was used as a cathode current collector, and the cathode active material layer was stacked on the aluminum foil to prepare a cathode layer.
Preparation of All-Solid Secondary Battery The cathode layer, solid electrolyte layer, and anode layer thus prepared were sequentially stacked in this order, sealed with a laminate film in vacuum, and pressed at 490 MPa for 30 minutes to prepare an all-solid secondary battery.

A portion of each of the cathode layer and the anode layer was exposed to the outside of the laminate film without breaking the vacuum of the battery, and the exposed portions were used as terminals of the cathode layer and the anode layer, respectively.
Measurement of Binding Strength between Anode Active Material Layer and Solid Electrolyte Layer A binding strength between the anode active material layer and the solid electrolyte layer was determined by measuring a peel strength using an AGS-X instrument manufactured by Shimadzu. Particularly, a sample prepared by stacking the anode layer on one surface of the solid electrolyte layer in the same sequential order of the preparation process of the secondary battery, and the resultant was treated with an isostatic pressure. The anode current collector was peeled from the sample at a rate of 100 mm/min., and a 90° peeling strength was measured therefrom. The peeling strength was measured by calculating an average of the measured values from the start of peeling to the end of peeling. Regarding samples in which the anode active material layer was not peeled from a surface of the solid electrolyte layer even when the anode current collector was peeled, after peeling the anode current collector, an adhesive tape was attached to a surface of the anode active material layer, and a 90° peeling strength was measured at the time of peeling the adhesive tape.
Measurement of Film Strength of Anode Active Material Layer A film strength of the anode active material layer was determined by measuring a shear strength (pseudo-shear strength) using SAICAS available from Dipla Wintes Co., Ltd. In particular, the anode active material layer was notched using a diamond blade, and a shear strength at this time was measured to determine a film strength of the anode active material layer. Particular conditions for the measurement were as follows.

Specifications of cutting blade: a retraction angle of 10°, a blade angle of 60°, a structure angle of 20°, and a blade width of 1 mm Movement conditions of cutting blade: horizontally at 2 μm/sec and vertically at 0.2 μm/sec.
Evaluation of Charge Current Density Characteristics Charge current density characteristics of the all-solid secondary battery prepared as described above are evaluated according to the following conditions.

The evaluation was performed in putting the all-solid secondary battery in a thermostat of about 25° C. The all-solid secondary battery was repeatedly charged until 4.25 V and discharged until 2.5 V, and all the discharging after the charging was performed at a constant current of about 0.3 $mA/cm^2$. In the charging, a current density per cycle increased, where a current density of the first cycle was about 0.3 $mA/cm^2$ and then was increased 0.1 $mA/cm^2$ in each cycle. Here, the maximum current, in which the charging was able to be performed without occurrence of a short-circuit, is each shown in the column of a critical current density (CCD) of Table 1. The CCD being 2.6 $mA/cm^2$ denotes that charging may be performed until a charge current of 2.6 $mA/cm^2$ without a short-circuit. Also, the binding strength in Table 1 represents a binding strength between the anode active material layer and the solid electrolyte. The film strength represents a film strength of the anode active material layer.

the solid electrolyte increases to realize the binding strength greater than 100 mN/mm. However, when a technology that may increase a binding strength without increasing brittle-

TABLE 1

|  | Composition of anode active material layer | Acid treatment Temperature [° C.] | Binding strength [mN/mm] | Film strength [MPa] | CCD [mA/cm$^2$] |
|---|---|---|---|---|---|
| Example 1 | Ag/AB/CB-1/PVDF = 25/25/50/5 | 40 | 20.1 | 20 | 2.6 |
| Example 2 | Ag/AB/CB-1/PVDF = 25/25/50/7 | 40 | 21.5 | 27 | 2.7 |
| Example 3 | Ag/AB/CB-1/PVDF = 25/25/50/5 | 50 | 40.3 | 20 | 2.7 |
| Example 4 | Ag/CB-2/CB-1/PVDF = 25/25/50/5 | 40 | 24.3 | 18 | 2.3 |
| Example 5 | Ag/CB-1/PVDF = 25/75/5 | 40 | 22.3 | 22 | 2.3 |
| Example 6 | Ag/AB/CB-1/PVDF = 25/25/50/5 | 55 | 61.1 | 20 | 2.2 |
| Example 7 | Ag/AB/CB-1/PVDF = 25/25/50/20 | 55 | 58.5 | 82 | 2.0 |
| Example 8 | Ag/AB/CB-1/PVDF = 25/25/50/3 | 40 | 20.9 | 14 | 1.2 |
| Example 9 | Ag/CB-1/PMMA = 25/75/7 | 40 | 24.7 | 12 | 1.0 |
| Example 10 | Ag/CB-1/SBR = 25/75/7 | 40 | 21.5 | 9 | 1.1 |
| Example 11 | Ag/AB/CB-1/PVDF = 25/25/50/25 | 55 | 57.3 | 105 | 1.3 |
| Example 12 | Si/AB/CB-1/PVDF = 7/25/50/5 | 40 | 22.1 | 19 | 2.4 |
| Example 13 | Si/AB/CB-1/PVDF = 25/25/50/7 | 40 | 21.1 | 21 | 1.8 |
| Example 14 | Ag/AB/CB-1/PVDF = 25/25/50/5 | 30 | 14.5 | 20 | 1.6 |
| Example 15 | Ag/AB/CB-1/PVDF = 25/25/50/7 | 40 | 36.5 | 27 | 2.9 |
| Example 16 | Ag/AB/CB-1/PVDF = 25/25/50/5 | 55 | 98.2 | 20 | 2.3 |
| Comparative Example 1 | Ag/AB/CB-1/PVDF = 25/25/50/5 | 20 | 7.0 | 20 | 0.7 |
| Comparative Example 2 | Ag/AB/CB-1/PVDF = 25/25/50/7 | 20 | 6.0 | 27 | 0.7 |

Referring to Table 1, it was confirmed that the all-solid secondary batteries prepared in Examples 1 to 16 having a binding strength between the anode active material layer and the solid electrolyte layer in a range of about 14 mN/mm to about 100 mN/mm had a CCD value of about 1 or greater and thus achieved a charge current density that may be suitable for practical use.

Also, it was confirmed that the all-solid secondary batteries prepared in Comparative Examples 1 and 2 having a binding strength not in a range of about 14 mN/mm to about 100 mN/mm had a short-circuit that occurred at a charge current density of less than about 1 mA/cm$^2$.

From this, it can be seen that when the binding strength between the anode active material layer and the solid electrolyte layer is in a range of about 14 mN/mm to about 100 mN/mm, a short-circuit of the all-solid secondary battery caused by precipitation of lithium may be sufficiently suppressed even when an oxide-based solid electrolyte is used.

In addition, it may be considered preferable since lithium precipitation between the solid electrolyte layer and the anode active material layer may be suppressed as the binding strength increases, but brittleness of the solid electrolyte layer increases as the binding strength increases.

Here, as a range to easily maintain the balance, the binding strength may be in a range of about 14 mN/mm to about 100 mN/mm. In the current technology, brittleness of ness of the solid electrolyte is developed in the future, it may be thought that an all-solid secondary battery having a binding strength over the upper-limit may be manufactured.

From the results of Examples 1, 3, and 6, it may be known that there is a tendency of increasing the binding strength by increasing a temperature of the acid treatment on the solid electrolyte layer.

From the comparison of Examples 1, 4, and 5, it may be confirmed that the same binding strength may be obtained even when the type of carbon in the anode active material layer is changed.

From the results of Examples 5, 9, and 10, in which the conditions are almost the same except the binder, it may be confirmed that the same binding strength may be obtained even when the type of a binder is changed.

Also, from the comparison between Example 2 and Example 15 and between Example 6 and Example 16, it was confirmed that when a surface of the solid electrolyte layer is polished before the acid treatment, an increase in brittleness of the solid electrolyte may be suppressed as much as possible, and the binding strength may further be improved.

From this result, it was confirmed that the binding strength between the anode active material layer and the solid electrolyte layer may be controlled by changing the conditions such as acid-treatment temperature or polishing of the solid electrolyte layer.

In addition, when a surface roughness (Sa) of a surface in contact with the anode active material of the solid electrolyte layer in Example 1 was measured, the surface roughness was about 0.21 μm Sa. The surface roughness of the solid electrolyte in Example 6 was about 0.28 μm Sa, and surface roughness of the solid electrolyte in Example 16 was about 0.35 μm Sa. From this, it may be deemed that the binding strength between the anode active material layer and the solid electrolyte layer may be changed by controlling a surface roughness of the solid electrolyte layer.

Also, in Examples 1 to 16, regarding Examples 1 to 7 and Examples 12 to 16 having a film strength of the anode active material layer in a range of about 16 MPa to about 85 MPa, the CCD was about 1.5 or greater, and thus it was confirmed that the all-solid secondary batteries may be charged without a short-circuit even at a high charge current density.

In terms of the film strength, from the results of Examples 4 and 5, it may be considered that the film strength may be controlled by a type of amorphous carbon used in the anode active material layer.

Also, from the comparison of Examples 7 and 11, it was confirmed the film strength of the anode active material layer tends to increase upon increasing an amount of the binder in the anode active material layer.

Also, from the results of Examples 5, 9, and 10, it was confirmed that the film strength of the anode active material layer changes when the type of a binder in the anode active material layer changes.

From this result, it may be considered that the film strength of the anode active material layer may be controlled by changing the type of amorphous carbon, the type of a binder, or the amount of a binder used in the anode active material layer.

Figure 3:
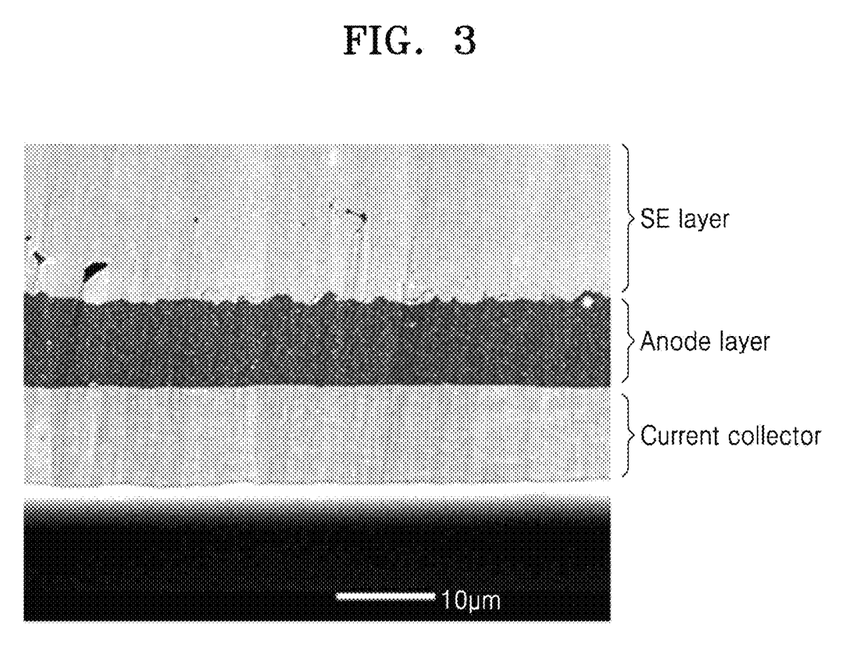
FIG. 3 is a scanning electron microscope (SEM) image of a cross-section of an all-solid secondary battery prepared in Example 1.

FIG. 3 is a scanning electron microscope (SEM) image of a cross-section of an all-solid secondary battery prepared in Example 1. The cross-sections of the all-solid secondary batteries prepared in Comparative Examples 1 and 2 were substantially the same.

Figure 4:
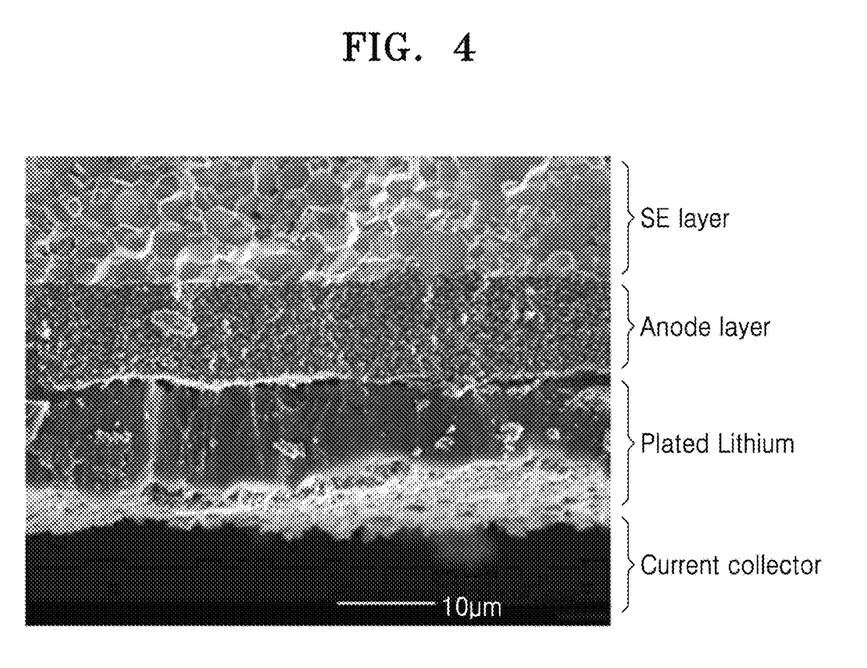
FIG. 4 is a cross-sectional SEM image of the all-solid secondary battery prepared in Example 1 after charging and during measurement of a charge density.

FIG. 4 is a cross-sectional SEM image after charging during measurement of a charge density of the all-solid secondary battery prepared in Example 1. As shown in FIG. 4, a lithium precipitation layer is only formed between the anode layer and the anode current collector, and a lithium precipitation layer is not formed between the solid electrolyte layer and the anode active material layer.

Figure 5:
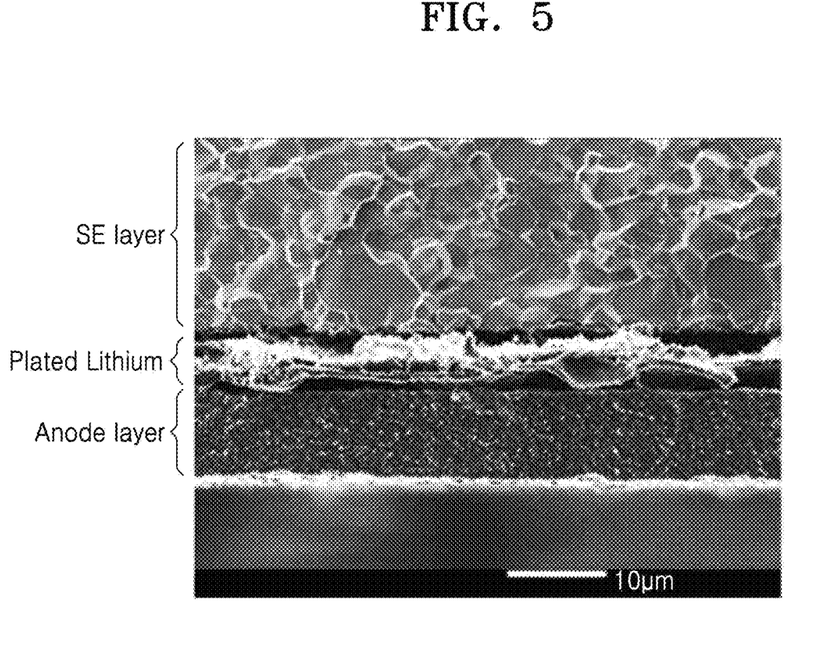
FIG. 5 is a cross-sectional SEM image of an all-solid secondary battery prepared in Comparative Example 2 after charging and during measurement of a charge density.

FIG. 5 is a cross-sectional SEM image after charging during measurement of a charge density of the all-solid secondary battery prepared in Comparative Example 2. Since the binding strength between the solid electrolyte layer and the anode active material layer decreased, as shown in FIG. 5, a lithium precipitation layer was formed between the solid electrolyte layer and the anode active material layer.

Figure 6:
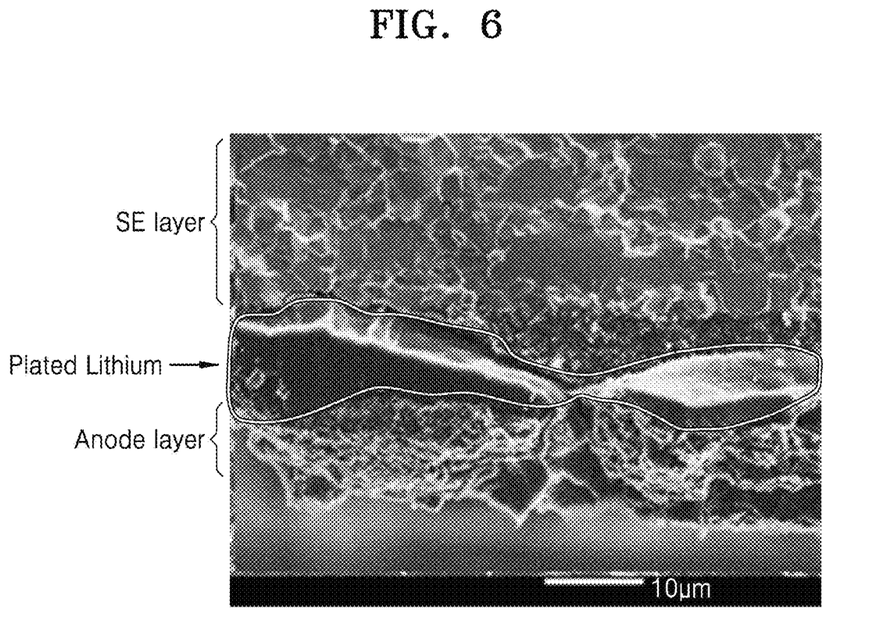
FIG. 6 is a cross-sectional SEM image of an all-solid secondary battery prepared in Comparative Example 1 after charging and during measurement of a charge density.

FIG. 6 is a cross-sectional SEM image after charging during measurement of a charge density of the all-solid secondary battery prepared in Comparative Example 1. Since the film strength of the anode active material layer was low, as shown in FIG. 6, a lithium precipitation layer was formed in the anode active material layer and between the solid electrolyte layer and the anode active material layer.

As described above, in an all-solid secondary battery according to one or more embodiments, lithium is precipitated in an anode layer by charging beyond an initial charge capacity of an anode active material layer, and thus a short-circuit or a decrease in battery capacity caused by lithium precipitation may be suppressed even when an oxide-based solid electrolyte is used as a solid electrolyte forming a solid electrolyte layer.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
a cathode layer;
an anode layer comprising an anode current collector and a layer comprising an anode active material and a binder on the anode current collector;
wherein the anode active material layer comprises about 5 parts to about 25 parts by weight of an anode active material that forms an alloy or a compound with lithium, about 50 parts to about 90 parts by weight of a carbonaceous anode active material comprising amorphous carbon, each based on 100 parts by weight of the layer, and
a solid electrolyte layer between the cathode layer and the anode layer,
wherein the solid electrolyte layer comprises:
$Li_{1+x+y}Al_xTi_{2-x}Si_yP_{3-y}O_{12}$ where $0<x<2$, and $0\leq y<3$, $Pb(Zr_{1-a}Ti_a)O_3$ wherein $0\leq a\leq 1$, $Pb_{1-x}La_xZr_{1-y}Ti_yO_3$ wherein $0\leq x<1$, and $0\leq y<1$, $Pb(Mg_{1/3}Nb_{2/3})O_3$—$PbTiO_3$, $Li_3PO_4$, $Li_xTi_y(PO_4)_3$ wherein $0<x<2$, and $0<y<3$), $Li_xAl_yTi_z(PO_4)_3$ wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ wherein $0\leq x\leq 1$, $0\leq y\leq 1$, $0\leq a\leq 1$, and $0\leq b\leq 1$), $Li_xLa_yTiO_3$ wherein $0<x<2$, and $0<y<3$), $LiAlO_2$, a $Li_2O$—$Al_2O_3$—$SiO_2$—$P_2O_5$—$TiO_2$—$GeO_2$, $Li_{3+x}La_3M_2O_{12}$ wherein M is Te, Nb, Zr, or a combination thereof, and $0\leq x\leq 10$, $Li_7La_3Zr_{2-x}Ta_xO_{12}$ wherein $0<x<2$), or a combination thereof, and
the solid electrolyte layer does not further comprise binders, and
a binding strength between the anode layer and the solid electrolyte layer is in a range of about 14 millinewtons per millimeter to about 100 millinewtons per millimeter, and
a film strength of the anode active material layer is in a range of about 16 megapascals to about 85 megapascals.

2. The all-solid secondary battery of claim 1, wherein the anode active material that forms an alloy or a compound with lithium comprises an alloy-forming element comprising gold, platinum, palladium, silicon, silver, aluminum, bismuth, tin, zinc, or a combination thereof.

3. The all-solid secondary battery of claim 1, wherein the anode active material is in the form of particles, and wherein the particles have a particle diameter in a range of about 20 nanometers to about 4 micrometers.

4. The all-solid secondary battery of claim 3, further comprising a conductive coating layer disposed on a surface of the particles, wherein a thickness of the conductive coating layer is in a range of about 1 nanometer to about 10 nanometers.

5. The all-solid secondary battery of claim 1, wherein an amount of the alloy-forming element is in a range of about 8 wt % to about 23 wt %, and an amount of the amorphous carbon is in a range of about 60 wt. % to about 86 wt. %, each based on a weight of the anode active material layer.

6. The all-solid secondary battery of claim 1, wherein an amount of the binder is in a range of about 0.5 parts to about 30 parts by weight based on 100 parts by weight of the anode active material layer.

7. The all-solid secondary battery of claim 1, wherein the cathode layer comprises a cathode active material layer, and the anode layer comprises an anode active material layer,
wherein a ratio of a charge capacity of the cathode active material layer to a charge capacity of the anode active material layer satisfies Expression (1):

$$0.01 < b/a < 0.5 \qquad (1)$$

wherein in Expression 1, a is a charge capacity of the cathode active material layer and b is a charge capacity of the anode active material layer.

8. The all-solid secondary battery of claim 1, wherein a thickness of the anode active material layer is in a range of about 1 micrometer to about 20 micrometers.

9. The all-solid secondary battery of claim 1,
wherein a surface roughness of a surface of the solid electrolyte layer in contact with the anode active material layer is in a range of about 0.05 micrometer Ra to about 0.6 micrometer Ra.

10. The all-solid secondary battery of claim 1, wherein the solid electrolyte comprises $Li_{1.3}Al_{0.3}Ti_{1.7}(PO_4)_3$, $Li_{1.07}Al_{0.69}Ti_{1.46}(PO_4)_3$, $Li_{0.34}La_{0.51}TiO_{2.94}$, $Li_7La_3Zr_2O_{12}$, or a combination thereof.

11. The all-solid secondary battery of claim 1, wherein the solid electrolyte layer is directly on the anode active material layer.

12. The all-solid secondary battery of claim 1, wherein the cathode layer comprises a cathode active material layer,
wherein the cathode active material layer comprises a cathode active material,
wherein the cathode active material comprises a compound selected from the group consisting of lithium cobalt oxide, lithium nickel oxide, lithium nickel cobalt oxide, lithium nickel cobalt aluminum oxide, lithium nickel cobalt manganese oxide, lithium manganate, lithium iron phosphate, nickel sulfide, copper sulfide, lithium sulfide, sulfur, iron oxide, vanadium oxide, and a combination thereof.

13. The all-solid secondary battery of claim 12, wherein the cathode active material comprises a lithium transition metal oxide having a layered structure and represented by one of Formulae 1 to 5:

$$Li_aNi_xCo_yM_zO_{2-b}A_b \qquad \text{Formula 1}$$

wherein in Formula 1,
1.0≤a≤1.2, 0≤b≤0.2, 0.3≤x<1, 0≤y≤0.3, 0<z≤0.3, and x+y+z=1,
M is selected from the group consisting of manganese, niobium, vanadium, magnesium, gallium, silicon, tungsten, molybdenum, iron, chromium, copper, zinc, titanium, aluminum, of and a combination thereof,
A is F, S, Cl, Br, or a combination thereof, $$LiNi_xCo_yMn_zO_2, \qquad \text{Formula 2}$$

wherein in Formula 2 x, y, and z are each independently 0.3≤x≤0.95, 0≤y≤0.2, 0<z≤0.2, and x+y+z=1, $$LiNi_xCo_yAl_zO_2 \qquad \text{Formula 3}$$

wherein in Formula 3, x, y, and z are each independently 0.3≤x≤0.95, 0≤y≤0.2, 0<z≤0.2, and x+y+z=1, $$LiNi_xCo_yMn_vAl_wO_2 \qquad \text{Formula 4}$$

wherein in Formula 4, 0.3≤x≤0.95, 0≤y≤0.2, 0<v≤0.2, 0<w≤0.2, and x+y+v+w=1, $$Li_aCo_xM_yO_{2-b}A_b \qquad \text{Formula 5}$$

wherein In Formula 5,
1.0≤a≤1.2, 0≤b≤0.2, 0.9≤x≤1, 0≤y≤0.1, and x+y=1,
M is selected from the group consisting of manganese, niobium, vanadium, magnesium, gallium, silicon, tungsten, molybdenum, iron, chromium, copper, zinc, titanium, aluminum, of and a combination thereof, and
A is F, S, Cl, Br, or a combination thereof.

14. The all-solid secondary battery of claim 1, wherein anode current collector is in a plate form or a foil form.

15. The all-solid secondary battery of claim 1,
wherein the cathode layer comprises a cathode active material layer, and wherein the cathode active material layer further comprises a second solid electrolyte, wherein the second solid electrolyte comprises an oxide solid electrolyte or a sulfide solid electrolyte, or a combination thereof.

* * * * *